United States Patent
Li et al.

(10) Patent No.: US 8,693,606 B2
(45) Date of Patent: Apr. 8, 2014

(54) METHOD AND APPARATUS FOR CODE ACQUISITION

(75) Inventors: Qiang Li, Hong Kong (HK); Sheng Chen, Hong Kong (HK)

(73) Assignee: Hong Kong Applied Science and Technology Research Institute Company Limited, Hong Kong Science Park, Shatin, New Territories, Hong Kong (CN)

( * ) Notice: Subject to any disclaimer, the term of this patent is extended or adjusted under 35 U.S.C. 154(b) by 420 days.

(21) Appl. No.: 12/780,257

(22) Filed: May 14, 2010

(65) Prior Publication Data

US 2011/0280348 A1    Nov. 17, 2011

(51) Int. Cl.
*H04L 7/00* (2006.01)

(52) U.S. Cl.
USPC .......................... 375/367; 375/354; 375/365

(58) Field of Classification Search
CPC ...... H04B 1/7156; H04B 1/713; H04B 1/707; H04B 1/70735; H04B 1/7085; H04B 1/7075; H04L 27/2647; H04L 25/04902; H04L 7/0008; H04L 7/02; H04L 7/042; H04J 3/0608
USPC .......... 375/149, 316–376, 134, 137, 145, 260
See application file for complete search history.

(56) References Cited

U.S. PATENT DOCUMENTS 6,874,096 B1 * 3/2005 Norrell et al. ................. 375/354
7,019,691 B1 * 3/2006 Soltanian et al. ....... 375/E1.003

OTHER PUBLICATIONS

Wang, Jun et al., "A Combined Code Acquisition and Symbol Timing Recovery Methods for TDS-OFDM," IEEE Transactions on Broadcasting, pp. 304-308, vol. 49, No. 3 (Sep. 2003).

* cited by examiner

*Primary Examiner* — Sam K Ahn
*Assistant Examiner* — Janice Tieu
(74) *Attorney, Agent, or Firm* — Ella Cheong Hong Kong; Sam T. Yip

(57) ABSTRACT

The present invention relates to a method and apparatus for code acquisition. The present invention performs variable delay correlation to obtain the peak correlation result which is immune to carrier frequency offset and Doppler. The present invention makes use of a mapping parameter which is immune to sampling frequency offset. In particular, the present invention is applicable to the DTMB standard.

16 Claims, 7 Drawing Sheets

METHOD AND APPARATUS FOR CODE ACQUISITION

TECHNICAL FIELD

The present application relates generally to telecommunications. In particular, the present application relates to digital terrestrial communications.

BACKGROUND

Digital Terrestrial Multimedia Broadcast (DTMB) is a digital terrestrial television (DTT) standard. Similar to many communications technologies, a signal is configured in a format having frames as seen in FIG. 1. Code acquisition is required to identify the PN (Pseudo Noise) code used in each DTMB frame. In particular, in one frame, DTMB currently adopts 3 different types of frame headers as seen in FIG. 2, namely:

Frame header type 1: FH420
Frame header type 2: FH595
Frame header type 3: FH945

Among these different types of frame headers, only FH420 and FH945 use different PN codes for different frames, while the PN code is fixed in FH595. Code acquisition is needed for type 1 and type 3. The PN codes are different in the sense that the PN code in each frame is generated by a PN sequence with different shift. In other words, the PN code can be retrieved if the PN shift is known while the PN sequence is generated based on a set of shifted m-sequences. The PN code is required because a frame number can be determined by checking the PN code; alternatively, based on the above, another way to determine the frame number is to check the PN shift between two consecutive frames since there is a one to one mapping between the PN shift between two consecutive frames and the PN code as defined in DTMB standard.

Attempts have been made to implement code acquisition. For example, the received signal is correlated with a local reference PN sequence by cross correlation. The PN shift is estimated by examining the distance between correlation peaks of two consecutive frames.

However, this approach suffers from several drawbacks. First, the cross correlation results are vulnerable to the carrier frequency offset (CFO).

Second, the distance between correlation peaks of two consecutive frames is interfered with by the sampling frequency offset (SFO).

Third, under a multipath environment, multiple correlation peaks will be observed and a complicated control scheme is needed to track the peaks of the same path and compute the distance between the corresponding peaks of two consecutive frames.

Fourth, the channel response changes from frame to frame under the Doppler effect, thus the correlation peaks change accordingly.

Fifth, the distance between the maximum correlation peaks of two frames is not only subject to the PN shift, but also subject to the change in the position of the strongest path under the Doppler effect. Therefore, the distance fails to give an accurate indication of the PN shift.

These problems also exist in code acquisition for other wireless communication systems and one example of code acquisition method which is susceptible to these problems is described in Jun Wang, Zhi-Xing Yang, Chang-Yong Pan, Meng Han and Lin Yang "A combined code acquisition and symbol timing recovery method for TDS-OFDM", *IEEE Trans. on broadcasting*, Vol. 49, pp. 304-308, September 2003. This method correlates the received signal with a local PN and requires peaking tracking to track the strongest peaks of consecutive frames to calculate the PN shift.

There is a need to make code acquisition robust to the influence of CFO, SFO and Doppler. In addition, such code acquisition should also be easy to implement and avoid the need of peak tracking in the design.

SUMMARY OF THE INVENTION

One aspect of the present invention is to identify the PN (Pseudo Noise) code in each frame under the DTMB standard.

Another aspect of the present invention is to compute the PN shift between two consecutive frames by delay correlation with variable distance. The amplitude of the output from the delay correlation with variable distance is not affected by the CFO. Therefore, the present invention is capable of solving the first problem discussed above.

Only one single correlation peak is observed under a multipath environment so that peak tracking is not required and no complicated control scheme to track the peaks is required. Therefore, the present invention is capable of solving the third problem.

Moreover, the position of the single correlation peak does not change even when the channel profile changes from frame to frame due to Doppler effect. Thus the method is robust to Doppler. Therefore, the present invention is capable of solving the fourth and fifth problems.

Another aspect of the present invention is to define a mapping parameter for the computation of the frame number. Since the mapping parameter is immune to SFO, the resulting frame number will be immune to SFO. Therefore, the present invention is capable of solving the second problem.

Other aspects of the present invention are also disclosed as illustrated by the following embodiments.

BRIEF DESCRIPTION OF THE DRAWINGS

These and other objects, aspects and embodiments of this claimed invention will be described hereinafter in more details with reference to the following drawings, in which:

DETAILED DESCRIPTION OF THE INVENTION

Figure 1:
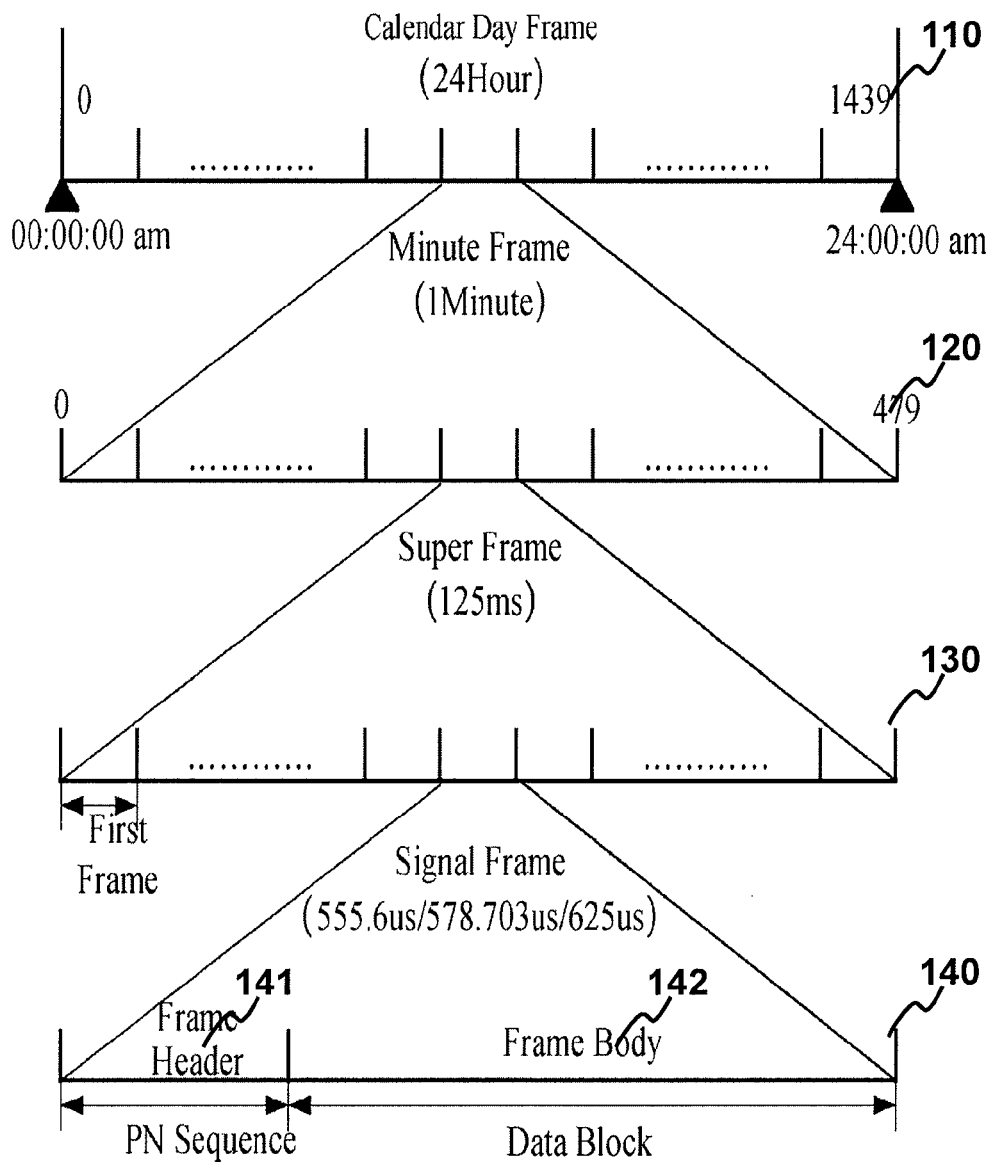
FIG. 1 depicts one embodiment of frame structure for a DTMB signal.

FIG. 1 depicts one embodiment of a frame structure for a DTMB signal. In general, there are four different hierarchies of frames: calendar day frame 110, minute frame 120, super frame 130, and signal frame 140.

Each calendar day frame 110 is defined to have a time span of 24 hours. One calendar day frame 110 is divided into 1,440 minute frames 120.

Each minute frame ($0^{th}$-$1439^{th}$) is defined to have a time span of 1 minute. One minute frame 120 is divided into 480 super frames 130.

Each super frame ($0^{th}$-$479^{th}$) is defined to have a time span of 125 ms. One super frame is divided into a number of signal frames 140, whereas the amount of the signal frames 140 in one super frame depends on the time span of one signal frame 140.

Each signal frame is defined to have a time span of either 555.6 µs or 578.703 µs, or 625 µs. One signal frame is divided into two portions, namely frame header 141 and frame body 142. The frame header 141 contains PN sequence (not shown) and the frame body 142 contains data block (not shown).

Figure 2:
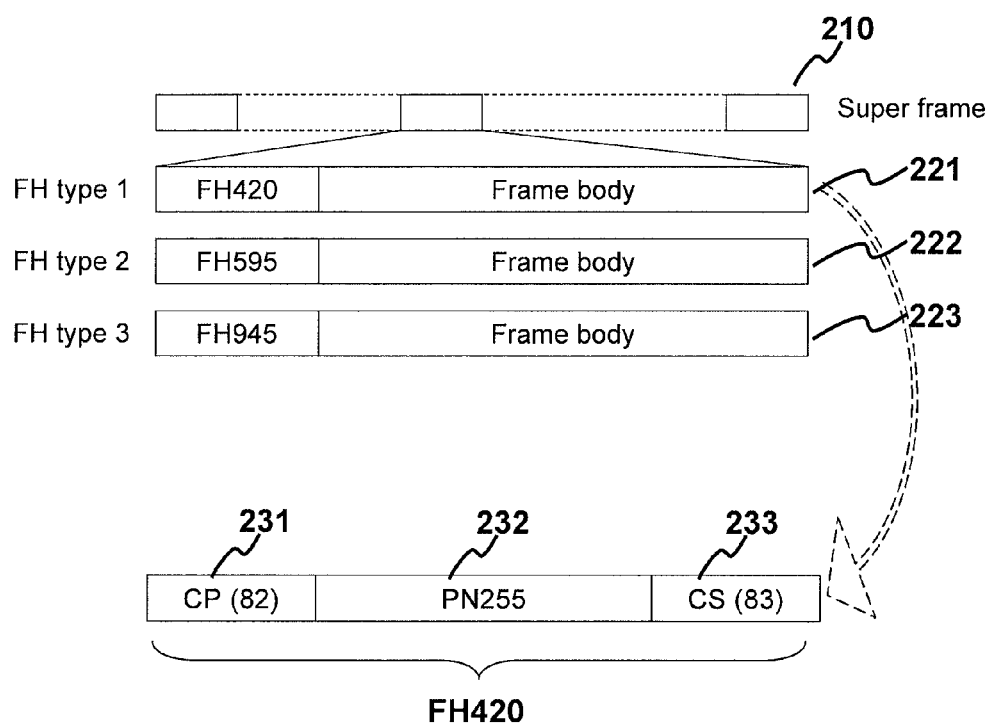
FIG. 2 depicts one embodiment of the three different types of frame header.

FIG. 2 depicts one embodiment of the three different types of frame header (FH). In one super frame 210, there are a number of signal frames. Three different types of frame header are available, namely FH420, FH595, and FH945. For example, one signal frame 221 contains the frame header FH420. One signal frame 222 contains the frame header FH595. One signal frame 223 contains the frame header FH945. For illustration purposes and without loss of generality, the signal frame 221 with the frame header FH420 is used as the embodiment to explain the ideas of the present invention.

FH420 is a frame header with length of 420 symbols. FH420 contains three portions, namely: pre-amble 231, PN sequence 232, and post-amble 233. One pre-amble 231 has a length of 82 symbols. One PN sequence 232 has a length of 255 symbols. One post-amble 233 has a length of 83 symbols.

The PN sequence 232 is a pseudo noise sequence which is a binary sequence with an autocorrelation that resembles, over a period, the autocorrelation of a random binary sequence. The PN sequence is usually generated by sequential logic circuits, for example, linear feedback shift registers. One embodiment of the PN sequence 232 is an m-sequence which is a PN sequence generated by a linear feedback shift register with the maximum period. Each signal frame 221 will have different PN sequences 232 in which each will be an m-sequence with different shift.

Variable Delay Correlation

Figure 3:
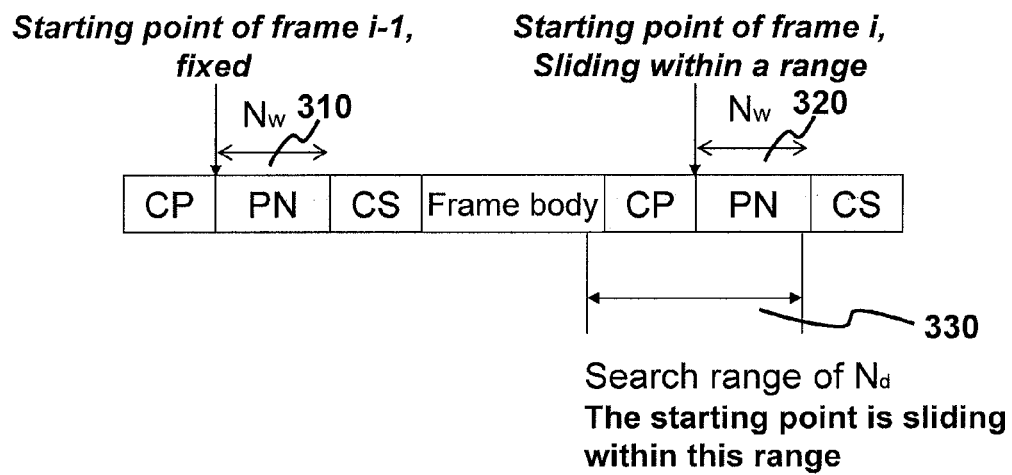
FIG. 3 depicts a signal received for code acquisition in one embodiment.

FIG. 3 depicts a signal received for code acquisition in one embodiment. Two consecutive frames are required for code acquisition. These two consecutive frames may be stored in one or more memories. Some non-limiting examples of suitable memories include volatile or nonvolatile memory, media and memory devices, including by way of example, semiconductor memory devices, e.g., RAM (random access memory), cache memory, flash memory devices or magnetic disks. Suppose the current frame is Frame i and the previous frame is Frame i−1. The header of the previous frame contains a PN sequence 310. The header of the current frame contains a PN sequence 320. Each PN sequence has a length of $N_w$ symbols. Using a microprocessor, cross correlation is performed by adding a delay to one of the signals to be cross correlated. This is also known as delay correlation with variable distance. Some non-limiting examples of suitable microprocessors include general and special purpose microprocessors, which may be implemented on special purpose logic circuitry, for example, an FPGA (field programmable gate array) or an ASIC (application-specific integrated circuit). A range of delay is determined by a search range $N_d$ 330. The search range $N_d$ 330 is configured to be large enough to ensure the starting point of the current frame is contained with such a search range. In a preferred embodiment, the search range $N_d$ 330 of the variable delay is larger than the maximum PN shift between the consecutive frame headers. In one embodiment, the search range $N_d$ 330 is defined to be 4 times the maximum PN shift since the received signal is 4 times oversampled in the present invention. If the PN sequence in use is an m-sequence with a different shift, the maximum shift in the m-sequence will be the maximum PN shift.

The delay correlation is computed by Equation (1) as follows:

$$D_i(N_d) = \sum_{k=1}^{N_w} r_{i-1}(k) \cdot r_i^*(k + N_d) \quad (1)$$

$\forall N_d \in$ search range

In one embodiment of the present invention, the search range is defined as [−2·max_PN_shift, 2·max_PN_shift]. The search range can be set wider in order to guarantee that the correlation peak is covered within the search range.

That the amplitude of the correlation output is not affected by CFO is illustrated by the following proof: Assume the CFO is Δf, the amplitude of the correlation output under the influence of CFO Δf will be given by Equation (2) as follows:

$$D'_i(N_d) = \sum_{k=1}^{N_w} r_{i-1}(k) e^{j2\pi\Delta f k} \cdot r_i^*(k+N_d) e^{-j2\pi\Delta f(k+N_d)} \quad (2)$$

$$= e^{-j2\pi\Delta f N_d} \sum_{k=1}^{N_w} r_{i-1}(k) \cdot r_i^*(k+N_d)$$

$$= e^{-j2\pi\Delta f N_d} D_i(N_d)$$

Therefore, $|D'_i(N_d)|=|D_i(N_d)|$, the amplitude of the correlation output remains the same.

According to the Equation (1), a series of amplitudes of the correlation output $|D_i(N_d)|$ is given for each shift of a symbol over the search range $N_d$ 330. A peak detector is used to determine the peak by searching for the maximum $|D_i(N_d)|$. The shift at which the maximum $|D_i(N_d)|$ is found is the PN shift $\Delta_i$ for the current frame.

Figure 4:
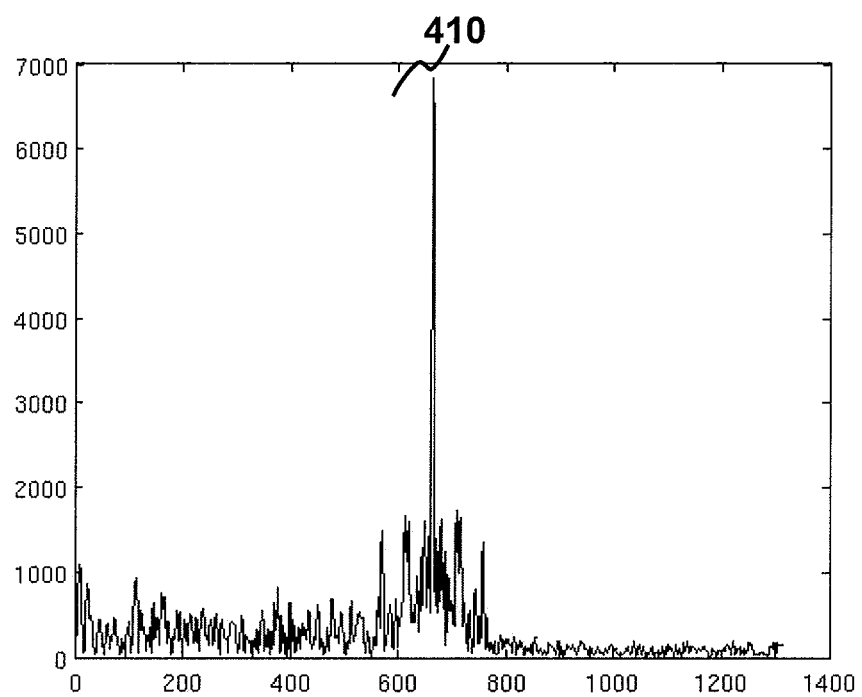
FIG. 4 depicts a plot of amplitude of the correlation output against the search range $N_d$ in one embodiment.

FIG. 4 depicts a plot of the amplitude of the correlation output against the search range $N_d$ in one embodiment. Only one single correlation peak 410 is observed under multipath environment so that peak tracking is not needed. Therefore, the result is robust to Doppler.

Mapping Parameter $s_i$

A mapping parameter $s_i$ is defined by Equation (3) as follows:

$$s_i = (\Delta_i - \Delta_{i-1}) \times \text{sign}(\Delta_i - \Delta_{i-2}) \quad (3)$$

The mapping parameter $s_i$ is based on the PN shifts of three consecutive frames, namely, the current frame, the previous frame and the frame prior to the previous frame. One to one mapping among $s_i$, the PN shift $\Delta_i$, and the frame number of the current frame is based on the Equation (4) as follows:

$$i = \begin{cases} (s_i+1)/2 & \text{if } s_i \leq -1 \\ 225 + (s_i+1)/2 & \text{if } s_i < -1 \end{cases} \quad (4)$$

One example of the mapping for FH420 is shown in the mapping table below:

| Frame No. i | $\Delta_i$ | Si |
|---|---|---|
| 0 | 0 | −1 |
| 1 | −1 | 1 |
| 2 | 2 | 3 |
| 3 | −3 | 5 |
| 4 | 4 | 7 |
| 5 | −5 | 9 |
| 6 | 6 | 11 |
| ... | ... | ... |
| 224 | 1 | −3 |

That the mapping parameter $s_i$ is immune to SFO is illustrated by the following proof: Assume the drift generated by SFO for one frame is $\epsilon$, the mapping parameter $s_i$ under the influence of SFO will be given by the Equation (5) as follows:

$$s'_i = [(\Delta_i + \varepsilon) - (\Delta_{i-1} + \varepsilon)] \times \text{sign}[(\Delta_i + \varepsilon) - (\Delta_{i-2} + \varepsilon)] \quad (5)$$
$$= s_i$$

Therefore, $s'_i = s_i$, the mapping parameter $s_i$ remains the same and the computation of frame number i based on $s_i$ is immune to SFO.

Figure 5:
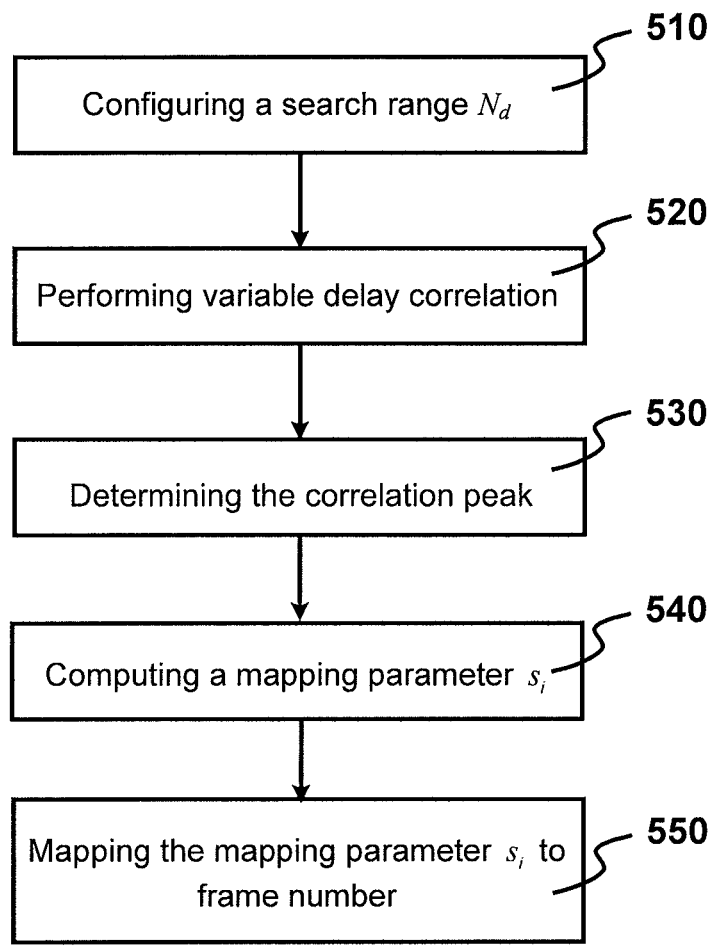
FIG. 5 depicts a flowchart of a code acquisition method in one embodiment.

FIG. 5 depicts a flowchart of a code acquisition method in one embodiment. A configuring step 510 configures a delay according to the frame header characteristic of the incoming signal. The incoming signal is a signal in accordance with the DTMB standard. The delay is defined as a search range $N_d$ which is a range covering a plurality of symbols in the incoming signal preceding and subsequent to the start of the current frame. As shown in FIG. 3 and the corresponding description, the number of symbols is two times the maximum phase shift of the pseudo noise sequence from each side of the start of the current frame. A controller is used to shift the incoming signal to provide the delay.

Based on the delay, a computing step 520 is performed by a processor to obtain a variable delay correlation result for each delay as configured by the controller. The computation of the variable delay correlation result is defined in Equation (1).

After obtaining $N_d$ variable delay correlation results $D_i(N_d)$, a determining step 530 determines which delay has the maximum value $|D_i(N_d)|$ of the variable delay correlation results. The maximum value $|D_i(N_d)|$ of the variable delay correlation results is determined by searching for the peak amplitude of the variable delay correlation results. The maximum value $|D_i(N_d)|$ of the variable delay correlation is also known as the correlation peak. The delay with such correlation peak is determined as the PN shift of the current frame $\Delta_i$.

With the use of the PN shift from three consecutive frames including the current frame, the previous frame and the frame prior to the previous frame, a mapping parameter $s_i$ is computed in the computing step 540 according to Equation (3). The mapping parameter $s_i$ is then mapped with a corresponding frame number according to Equation (4) in a mapping step 550 so as to obtain the frame number of the current frame.

Figure 6:
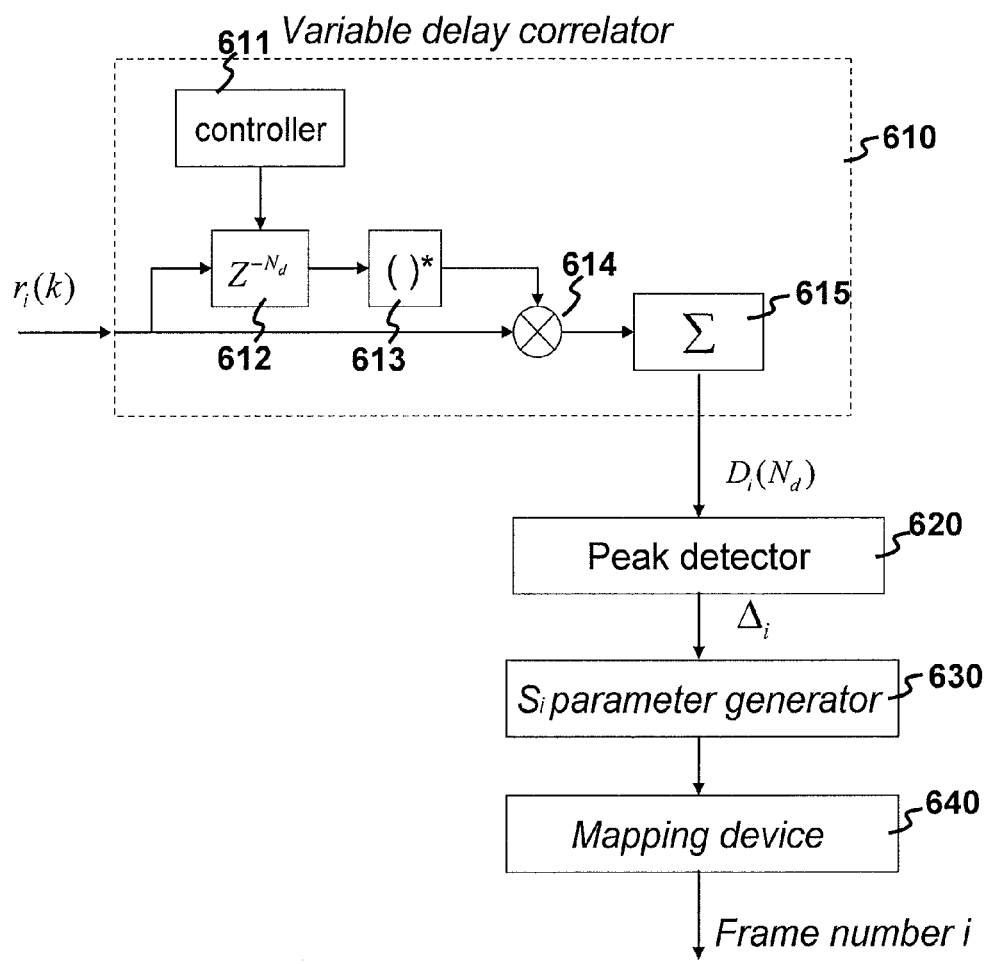
FIG. 6 depicts a block diagram of a code acquisition apparatus in on embodiment.

FIG. 6 depicts a block diagram of a code acquisition apparatus in one embodiment. A controller 611 configures a delay according to the frame header characteristics of the incoming signal. In one embodiment, the incoming signal is a signal in accordance with the DTMB standard. The delay is defined as a search range $N_d$ which is a range covering a plurality of symbols in the incoming signal preceding and subsequent to the start of the current frame. As shown in FIG. 3 and the corresponding description, the number of symbols is two times the maximum phase shift of the pseudo noise sequence from each side of the start of the current frame. The controller 611 shifts the incoming signal to provide the delay using a shifter 612. After being provided with a delay, the current frame is used to compute its conjugate by a conjugate generator 613. Then a multiplier 614 and an adder 615 are used to perform the cross correlation between the PN sequence of the current frame and the PN sequence of the previous frame. The controller 611, the shifter 612, the conjugate generator 613, the multiplier 614 and the adder 615 together form a variable delay correlator 610 performing the variable delay correlation as defined in Equation (1) to obtain a variable delay correlation result for each delay as configured by the controller.

After obtaining $N_d$ variable delay correlation results $D_i(N_d)$, a peak detector 620 determines which delay has the maximum value $|D_i(N_d)|$ of the variable delay correlation results. The maximum value $|D_i(N_d)|$ of the variable delay correlation results is determined by searching for the peak amplitude of the variable delay correlation results. The delay using this peak is determined as the PN shift of the current frame $\Delta_i$.

With the use of the PN shift from three consecutive frames including the current frame, the previous frame and the frame prior to the previous frame, a mapping parameter $s_i$ is computed by a parameter generator 630 according to the Equation (3). The mapping parameter $s_i$ is then mapped with a corresponding frame number according to the Equation (4) or the mapping table as shown above by a mapping device 640 so as to obtain the frame number of the current frame.

Figure 7:
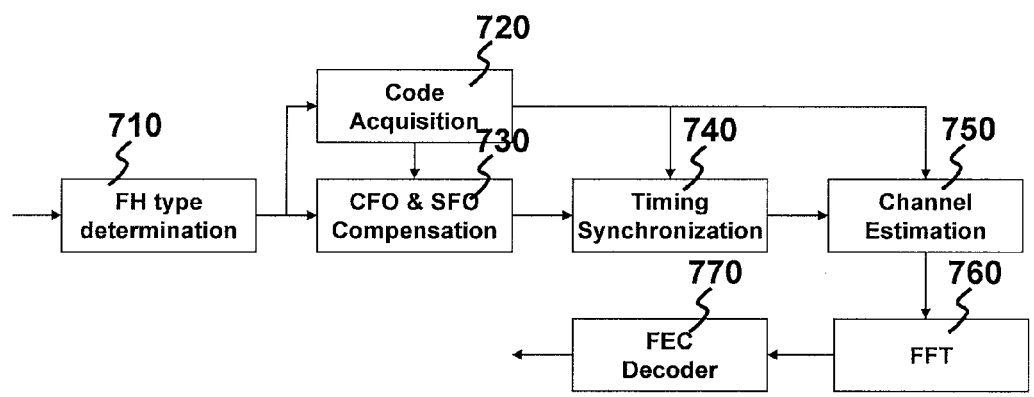
FIG. 7 depicts a block diagram of a DTMB signal receiver in one embodiment.

FIG. 7 depicts a block diagram of a DTMB signal receiver in one embodiment. An incoming signal is processed by the DTMB signal receiver. The frame header type is determined by the FH type determination 710. After determining the frame header type, the incoming signal is further processed according to whether the frame header is FH420, FH595 or FH945. Among these different types of frame headers, only FH420 and FH945 use different PN codes for different frames, while the PN code is fixed in FH595. The further processing includes processes such as CFO and SFO compensation 730, timing synchronization 740 and channel estimation 750. These processes require the PN code as obtained from code acquisition 720. The code acquisition 720 is performed only for signal with frame header FH420 or FH945 according to the present invention as described above. According to the result from the channel estimation 750, the incoming signal is processed by Fast Fourier Transform (FFT) 760 and subsequently by a FEC decoder 770 to retrieve an output signal.

Embodiments of the present invention may be implemented in the form of software, hardware, application logic or a combination of software, hardware and application logic. The software, application logic and/or hardware may reside on integrated circuit chips, modules or memories. If desired, part of the software, hardware and/or application logic may reside on integrated circuit chips, part of the software, hardware and/or application logic may reside on modules, and part of the software, hardware and/or application logic may reside on memories. In one exemplary embodiment, the application logic, software or an instruction set is maintained on any one of various conventional non-transitory computer-readable media.

Processes and logic flows which are described in this specification can be performed by one or more programmable processors executing one or more computer programs to perform functions by operating on input data and generating output. Processes and logic flows can also be performed by special purpose logic circuitry, e.g., an FPGA (field programmable gate array) or an ASIC (application-specific integrated circuit).

Apparatus or devices which are described in this specification can be implemented by a programmable processor, a computer, a system on a chip, or combinations of them, by operating on input and generating output. Apparatus or devices can include special purpose logic circuitry, e.g., an FPGA (field programmable gate array) or an ASIC (application-specific integrated circuit). Apparatus or devices can also include, in addition to hardware, code that creates an execution environment for computer program, e.g., code that constitutes processor firmware, a protocol stack, a database management system, an operating system, a cross-platform runtime environment, e.g., a virtual machine, or a combination of one or more of them.

Processors suitable for the execution of a computer program include, for example, both general and special purpose microprocessors, and any one or more processors of any kind of digital computer. Generally, a processor will receive instructions and data from a read-only memory or a random access memory or both. The elements of a computer generally include a processor for performing or executing instructions, and one or more memory devices for storing instructions and data.

Computer-readable medium as described in this specification may be any media or means that can contain, store, communicate, propagate or transport the instructions for use by or in connection with an instruction execution system, apparatus, or device, such as a computer. A computer-readable medium may comprise a computer-readable storage medium that may be any media or means that can contain or store the instructions for use by or in connection with an instruction execution system, apparatus, or device, such as a computer. Computer-readable media may include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

A computer program (also known as, e.g., a program, software, software application, script, or code) can be written in any programming language, including compiled or interpreted languages, declarative or procedural languages, and it can be deployed in any form, including as a stand-alone program or as a module, component, subroutine, object, or other unit suitable for use in a computing environment. A computer program can be deployed to be executed on one computer or on multiple computers that are located at one single site or distributed across multiple sites and interconnected by a communication network.

Embodiments and/or features as described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with one embodiment as described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The whole specification contains many specific implementation details. These specific implementation details are not meant to be construed as limitations on the scope of the invention or of what may be claimed, but rather as descriptions of features specific to particular embodiments of the invention.

Certain features that are described in the context of separate embodiments can also be combined and implemented as a single embodiment. Conversely, various features that are described in the context of a single embodiment can also be implemented in multiple embodiments separately or in any suitable subcombinations. Moreover, although features may be described as acting in certain combinations and even initially claimed as such, one or more features from a combination as described or a claimed combination can in certain cases be excluded from the combination, and the claimed combination may be directed to a subcombination or variation of a subcombination. Although various aspects of the invention are set out in the independent claims, other aspects of the invention comprise other combinations of features from the embodiments and/or from the dependent claims with the features of the independent claims, and not solely the combinations explicitly set out in the claims.

Certain functions which are described in this specification may be performed in a different order and/or concurrently with each other. Furthermore, if desired, one or more of the above-described functions may be optional or may be combined.

The above descriptions provide exemplary embodiments of the present invention, but should not be viewed in a limiting sense. Rather, it is possible to make variations and modifications without departing from the scope of the present invention as defined in the appended claims.

What is claimed is:

1. An apparatus for code acquisition of an incoming signal, comprising:
    a controller which configures one or more delays according to frame header characteristics of the incoming signal;
    a variable delay correlator which computes a variable delay correlation result for each of the one or more delays that fall within a search range as configured by the controller;
    a peak detector which determines which delay of the one or more delays has a maximum value of the variable delay correlation results;
    a device which computes a mapping parameter; and
    a mapping device which maps the mapping parameter with a corresponding frame number;
    wherein the mapping parameter is computed according to pseudo noise sequence phase shifts computed for three consecutive frames that include a current frame, a previous frame, and a frame prior to the previous frame, the computing of the mapping parameter including a step of subtracting one of the phase shifts by another one of the phase shifts in order to substantially cancel an extra phase shift, introduced by a sampling frequency offset, in the phase shifts in the computing of the mapping parameter of the current frame, so that the mapping parameter is immune to the sampling frequency offset.

2. The apparatus as claimed in claim 1, wherein:
    one of the frame header characteristics is total number of symbols of a pseudo noise sequence.

3. The apparatus as claimed in claim 2, wherein:
the total number of symbols is two times a maximum phase shift of the pseudo noise sequence from each side of the start of the current frame.

4. The apparatus as claimed in claim 1, wherein:
the incoming signal is a signal in accordance with the Digital Terrestrial Multimedia Broadcast (DTMB) standard.

5. The apparatus as claimed in claim 1, wherein:
the one or more delays are within a range of delays which covers a plurality of symbols in the incoming signal preceding and subsequent to the start of the current frame.

6. The apparatus as claimed in claim 1, wherein:
the mapping parameter is computed further according to $$s_i = (\Delta_i - \Delta_{i-1}) \times \text{sign}(\Delta_i - \Delta_{i-2})$$

where $s_i$ is the mapping parameter, $\Delta_i$ is the pseudo noise sequence phase shift computed for the current frame, $\Delta_{i-1}$ is the pseudo noise sequence phase shift computed for the previous frame, and $\Delta_{i-2}$ is the pseudo noise sequence phase shift computed for the frame prior to the previous frame.

7. The apparatus as claimed in claim 6, wherein:
the corresponding frame number is mapped from the mapping parameter according to $$i = \begin{cases} (s_i + 1)/2 & \text{if } s_i \geq -1 \\ 225 + (s_i + 1)/2 & \text{if } s_i < -1 \end{cases}$$

where i is the corresponding frame number.

8. The apparatus as claimed in claim 6, wherein:
the corresponding frame number is mapped from the mapping parameter according to the following mapping table:

| i | $s_i$ |
|---|---|
| 0 | −1 |
| 1 | 1 |
| 2 | 3 |
| 3 | 5 |
| 4 | 7 |
| 5 | 9 |
| 6 | 11 |
| ... | ... |
| 224 | −3 | where i is the corresponding frame number.

9. A method for code acquisition of an incoming signal, comprising:
configuring by a controller, one or more delays according to frame header characteristics of the incoming signal;
computing a variable delay correlation result for each of the one or more delays that fall within a search range as configured by the controller;
determining which delay has a maximum value of the variable delay correlation results;
computing a mapping parameter; and
mapping the mapping parameter with a corresponding frame number;
wherein the mapping parameter is computed according to pseudo noise sequence phase shifts computed for three consecutive frames that include a current frame, a previous frame, and a frame prior to the previous frame, the computing of the mapping parameter including a step of subtracting one of the phase shifts by another one of the phase shifts in order to substantially cancel an extra phase shift, introduced by a sampling frequency offset, in the phase shifts in the computing of the mapping parameter of the current frame, so that the mapping parameter is immune to the sampling frequency offset.

10. The method as claimed in claim 9, wherein:
one of the frame header characteristics is total number of symbols of a pseudo noise sequence.

11. The method as claimed in claim 10, wherein:
the total number of symbols is two times a maximum phase shift of the pseudo noise sequence from each side of the start of the current frame.

12. The method as claimed in claim 9, wherein:
the incoming signal is a signal in accordance with the Digital Terrestrial Multimedia Broadcast (DTMB) standard.

13. The method as claimed in claim 9, wherein:
the one or more delays are within a range of delays which covers a plurality of symbols in the incoming signal preceding and subsequent to the start of the current frame.

14. The method as claimed in claim 9, wherein:
the mapping parameter is computed further according to $$s_i = (\Delta_i - \Delta_{i-1}) \times \text{sign}(\Delta_i - \Delta_{i-2})$$

where $s_i$ is the mapping parameter, $\Delta_i$ is the pseudo noise sequence phase shift computed for the current frame, $\Delta_{i-1}$ is the pseudo noise sequence phase shift computed for the previous frame, and $\Delta_{i-2}$ is the pseudo noise sequence phase shift computed for the frame prior to the previous frame.

15. The method as claimed in claim 14, wherein:
the corresponding frame number is mapped from the mapping parameter according to $$i = \begin{cases} (s_i + 1)/2 & \text{if } s_i \geq -1 \\ 225 + (s_i + 1)/2 & \text{if } s_i < -1 \end{cases}$$

where i is the corresponding frame number.

16. The method as claim 14, wherein:
the corresponding frame number is mapped from the mapping parameter according to the following mapping table:

| i | $s_i$ |
|---|---|
| 0 | −1 |
| 1 | 1 |
| 2 | 3 |
| 3 | 5 |
| 4 | 7 |
| 5 | 9 |
| 6 | 11 |
| ... | ... |
| 224 | −3 | where i is the corresponding frame number.

* * * * *